United States Patent [19]
Cho et al.

[11] Patent Number: 5,748,918
[45] Date of Patent: May 5, 1998

[54] METHOD AND APPARATUS FOR SUPPORTING TWO SUBTRACTIVE DECODE AGENTS ON THE SAME BUS IN A COMPUTER SYSTEM

[75] Inventors: Sung-Soo Cho, Sunnyvale; Chao-Hsin Chi, San Jose; David Chang, Daly City, all of Calif.

[73] Assignee: Intel Corporation, Santa Clara, Calif.

[21] Appl. No.: 673,450

[22] Filed: Jun. 28, 1996

[51] Int. Cl.$^6$ .............................. G06F 12/02; G06F 13/38
[52] U.S. Cl. ...................... 395/306; 395/281; 395/308; 395/401
[58] Field of Search ................................. 395/281, 306, 395/308, 401, 823

[56] References Cited

U.S. PATENT DOCUMENTS 5,379,384  1/1995  Solomon .............................. 395/306
5,568,621  10/1996  Wooten ............................... 395/292

Primary Examiner—Glenn A. Auve
Assistant Examiner—Jeffrey K. Seto
Attorney, Agent, or Firm—Blakely, Sokoloff, Taylor & Zafman

[57] ABSTRACT

A computer system has a first bus, a first bus bridge, and a second bus bridge. The first bridge connects the first bus to a second bus and the second bridge connects the first bus to a third bus. Normally, the first bridge behaves as the only subtractive decode agent on the first bus, claiming all transactions initiated on the first bus that target agents on the second bus or the third bus. If the first bridge claims a transaction targetting an agent on the third bus, the first bridge transfers the responsibility to respond to the transaction to the second bridge. The first bridge does not behave as the subtractive decode agent on the first bus when transactions are initiated on the second bus and forwarded to the first bus. In that case, the second bridge behaves as the subtractive decode agent on the first bus.

25 Claims, 7 Drawing Sheets

METHOD AND APPARATUS FOR SUPPORTING TWO SUBTRACTIVE DECODE AGENTS ON THE SAME BUS IN A COMPUTER SYSTEM

FIELD OF THE INVENTION

The invention relates to the field of computer systems and, in particular, to the field of determining targets of bus transactions.

BACKGROUND OF THE INVENTION

Generally, bus transactions in computer systems involve a "master" and a "target". The master is the bus agent that initiates the transaction, and the target is the bus agent that responds to or is selected by the transaction. If the bus protocol requires a determination of which agent is the target of a particular transaction, that determination can be centralized or distributed. When target determination is distributed, the target itself is responsible for claiming the transaction.

The protocol of the Peripheral Component Interconnect (PCI) bus includes distributed target determination (PCI Local Bus Specification, Revision 2.1, published July 1995). Bus masters initiate transactions by asserting the FRAME# signal and driving the address of the transactions onto AD lines. Normally, each transaction has one target, so one and only one agent on the bus has a responsibility to respond to the transaction as the target. That agent claims the responsibility to respond to the transaction by asserting the DEVSEL# signal. The responsibility to respond to the transaction includes a responsibility to assert the TRDY# signal to indicate that the target is ready to complete the transaction and either a responsibility to provide or accept data, depending on whether the transaction is a read or a write.

To determine which agent should claim a transaction, potential target agents decode the address to determine if they are the actual target. Potential target agents that perform such a decode operation are commonly referred to as "positive" decode agents. Assuming that no two targets reside at the same address, no more than one positive decode agent will claim the transaction. By limiting the amount of time available for address decoding, the PCI bus protocol allows a potential target agent to claim transactions without performing a decode by claiming any transaction that is not claimed by a positive decode agent after a finite period of time. Such an agent is commonly referred to as a "subtractive" decode agent. To prevent target conflicts, the prior art allows only one agent on the bus to implement a subtractive decode.

This limitation preventing the use of multiple subtractive decode agents on a bus presents a problem in a system with multiple PCI buses. For example, FIG. 1 shows a system with PCI bus 101 and PCI bus 102 connected by PCI bridge 103. Bridge 103 transfers signals between buses with a delay of two clock periods. Agent 104 resides on bus 101, and is a positive decode agent requiring two clock periods for decoding. Agents 105, 106, and 107 reside on bus 102. Agent 105 is the slowest positive decode agent on bus 102, requiring three clock periods for decoding. Therefore, when agent 105 is targeted, it will claim the transaction on the third clock after the transaction is initiated. Agent 106 is the subtractive decode agent of bus 102, claiming all unclaimed transactions on the fourth clock after initiation of the transaction.

Referring to the timing diagram of FIG. 2 along with FIG. 1, assume that at time 201 agent 107 initiates a transaction that targets agent 104. Due to the delay across bridge 103, the address of the transaction is driven on bus 101 two clock periods after the address is driven on bus 102. Therefore, agent 104 begins decode at time 203, two clock periods after the transaction is initiated. Agent 104 completes decode at time 205, four clock periods after the transaction is initiated, and asserts the DEVSEL# signal on bus 101 to claim the transaction. The DEVSEL# signal is transferred across bridge 103, resulting in the assertion of the DEVSEL# signal on bus 102 at time 207. However, agent 106 will have already mistakenly claimed the transaction at time 205, four clock periods after the transaction was initiated.

One possible solution to this problem might be to increase the finite time period allowed for positive decode. However, that solution would violate the bus protocol, which allows only three clock periods for positive decode, as well as decrease performance by increasing the latency of transactions to the subtractive decode agent. Another possible solution might involve reducing the delay across bridge 103 and restricting the decode time of all agents on bus 101. However, that solution would require performance improvements to bridge 103 and certain agents on bus 101, and decrease flexibility of bus 101 by excluding slow decode agents. Another possible solution might be to require bridge 103 to act as a positive decode agent on bus 102 on behalf of all agents on bus 101. However, that solution would add complexity to bridge 103, as well as decrease flexibility of bus 101 by limiting the available address space and device configuration model to that which can be accomodated by bridge 103.

The present invention overcomes the problems of the prior art described above by providing support for two subtractive decode agents on the same bus in a computer system.

SUMMARY OF THE INVENTION

The present invention provides a method and apparatus for determining the target of bus transactions in a computer system. In one embodiment, the computer system includes a bus and two agents coupled to the bus. The first agent claims to be a target of a transaction on the bus without decoding the address associated with the transaction. Although the first agent claims the transaction, the second agent responds to the transaction as the target.

DETAILED DESCRIPTION

A method and apparatus for determining the target of bus transactions in a computer system is described. In the following description, numerous specific details are set forth, such as specific bus protocols and signal names, in order to provide a thorough understanding of the present invention. However, it will be apparent to one skilled in the art that the present invention can be practiced without these specific details. In other instances, some details have been omitted in order to avoid obscuring the present invention.

Figure 1:
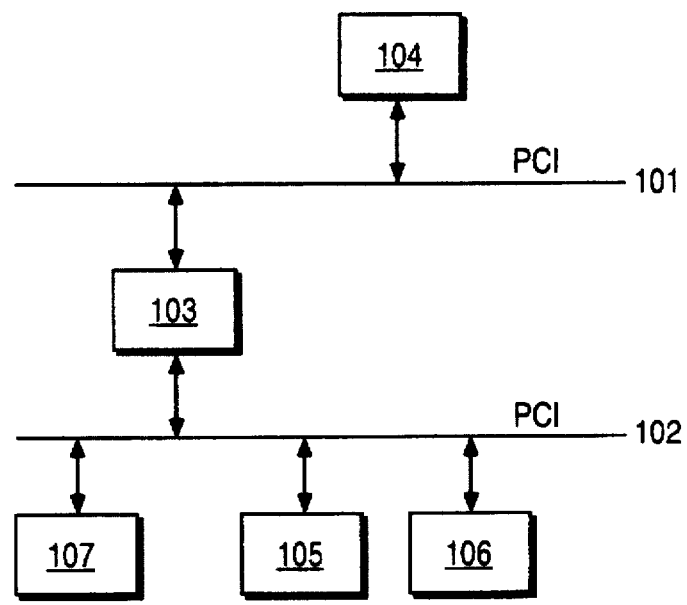
FIG. 1 is a block diagram of a prior art system with two PCI buses and one subtractive decode agent.
Figure 2:
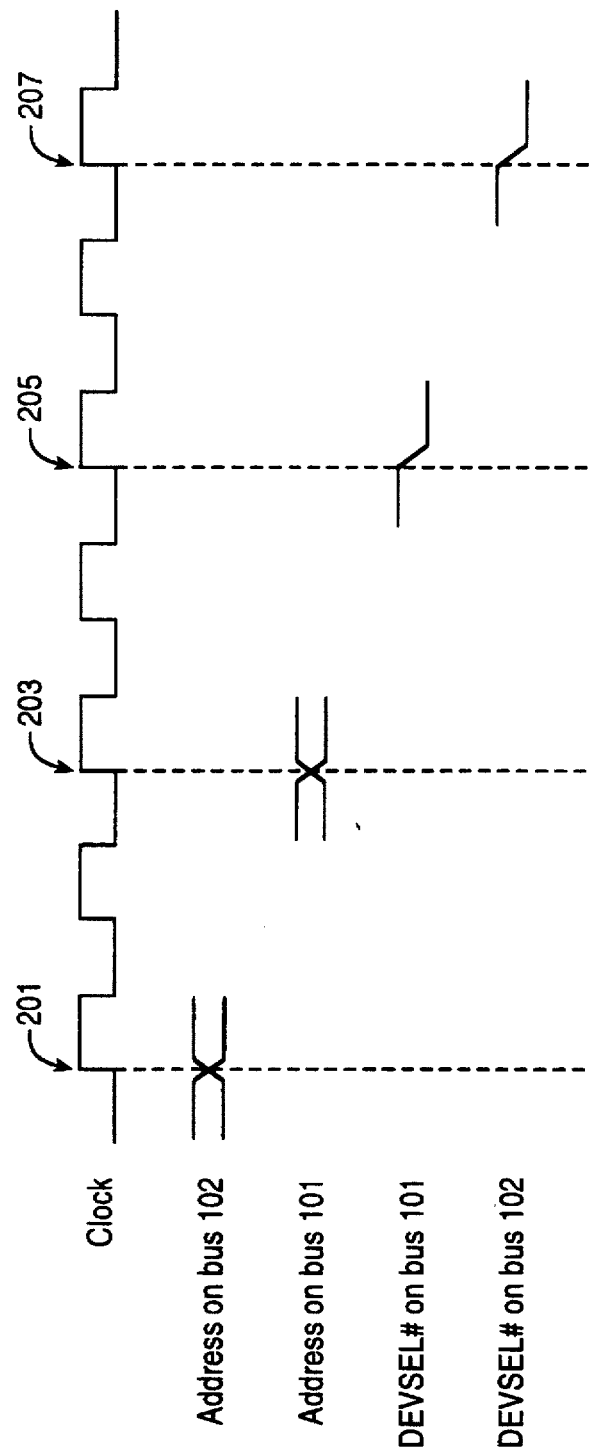
FIG. 2 is a timing diagram illustrating a problem with the prior art system of FIG. 1.
Figure 3:
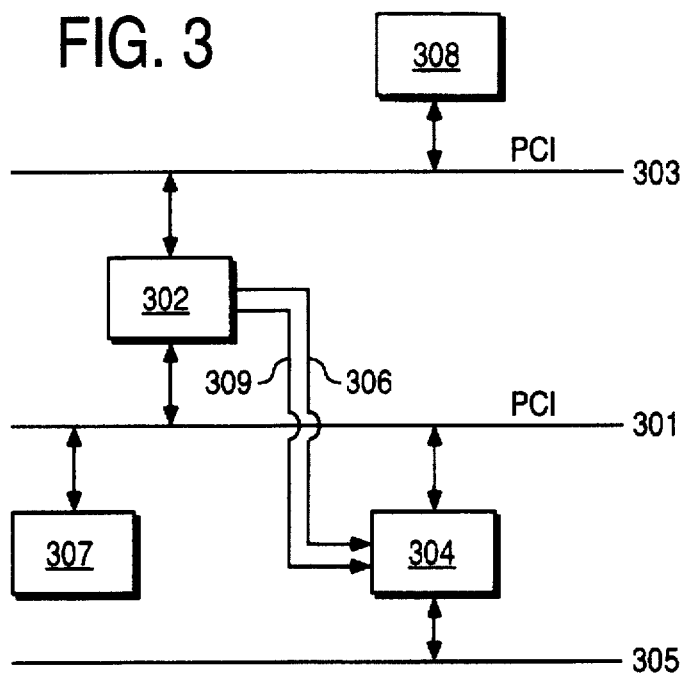
FIG. 3 is a block diagram of one embodiment of the computer system of the present invention.

FIG. 3 is a block diagram of one embodiment of the computer system of the present invention. The computer system of FIG. 3 has three buses, 301, 303, and 305, and four agents, 302, 304, 307, and 308. However, the computer system can have any number of buses greater than zero and any number of agents greater than one within the scope of the present invention. An agent is any device coupled to a bus, for example a memory controller, an input/output controller, or a bus bridge. Bus 301 can be any type of bus that follows a protocol in which the targets claim transactions. The Peripheral Component Interconnect (PCI) bus is one example of such a bus (PCI Local Bus Specification, Revision 2.1, published July 1995).

Agent 302 is a subtractive decode agent residing on bus 301. In this embodiment, subtractive decode agent 302 is a bridge to another bus. One advantage of implementing a bus bridge as a subtractive decode agent is that when a transaction is initiated on one bus, the bridge does not have to perform a positive decode on behalf of all of the agents that reside on the other bus. Such a positive decode would almost certainly be slow and costly given the likelyhood that the bus will have a large, fragmented, and possibly dynamic address space. Agent 302 is shown as a bridge to bus 303. However, agent 302 could be any other type of subtractive decode agent within the scope of the present invention.

Agent 304 is a second agent residing on bus 301. To illustrate one advantage of the present invention, agent 304 is shown in FIG. 3 as a bridge to bus 305. For the reason explained above, it would be advantageous to implement agent 304 as a subtractive decode agent. However, to implement bridge 304 as a true subtractive decode agent would result in a target conflict between agents 302 and 304 any time that a transaction was not claimed by a positive decode agent on bus 301.

By definition both agent 304 and bridge 302 cannot behave as subtractive decode agents. However, the present invention allows both agent 304 and agent 302 to behave as subtractive decode agents through the use of signal 306. Signal 306, referred to herein as the NOGO signal, between agents 302 and 304 indicates whether the responsibility to respond to a transaction is to be transferred from agent 302 to agent 304.

Figure 4:
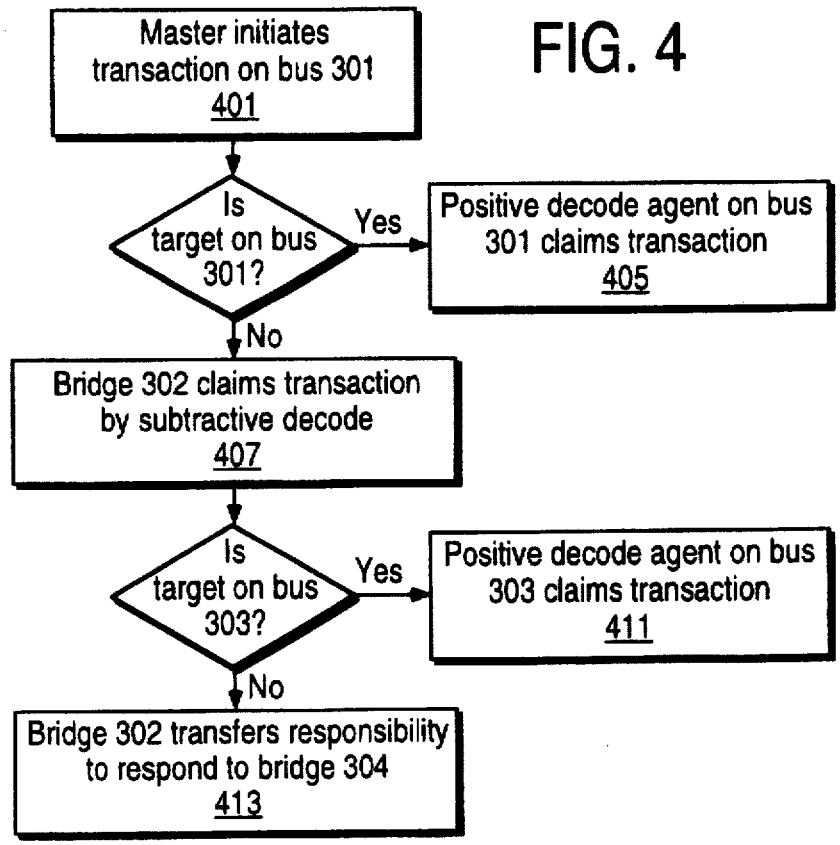
FIG. 4 is a flow diagram illustrating the use of the NOGO signal in determining the target of a bus transaction according to one embodiment of the present invention.

FIG. 4 illustrates the use of NOGO signal 306. Assume that buses 301 and 303 are PCI buses. In step 401, master agent 307 initiates a transaction on bus 301 that could be targetted to an agent on bus 301, bus 303, or bus 305. If the transaction is targetted to an agent on bus 301, that agent performs a positive decode and claims the transaction in step 405. However, if the transaction is not claimed by positive decode on bus 301, agent 302 claims the transaction by subtractive decode in step 407, and forwards the transaction to bus 303. Then, if the transaction is targetted to an agent on bus 303, that agent performs a positive decode and claims the transaction on bus 303 in step 411, causing agent 302 to retain the responsibility to respond to the transaction on bus 301. In that case it is appropriate that agent 304 did not claim the transaction by subtractive decode. However, if no agent on bus 303 claims the transaction, then by the process of elimination, the target of the transaction must reside on bus 305. In that case agent 304, not agent 302, should be responsible for responding to the transaction on bus 301. Therefore, in step 413, agent 302 uses NOGO signal 306 to transfer the responsibility to respond to agent 304. Agent 304 tracks the transaction from step 401 to step 413 in preparation to respond, including latching of the address and bus command signals if necessary. Then, in step 413, agent 304 samples NOGO signal 306 to determine whether or not agent 304 should respond to the transaction.

In one embodiment of the present invention wherein bus 301 is a PCI bus, transfer of the responsibility to respond means that agent 304, not agent 302, asserts the TRDY# signal to indicate that the target is ready to complete the transaction and provides or accepts data depending on whether the transaction is a read or a write. In another embodiment of the present invention, also wherein bus 301 is a PCI bus, transfer of the responsibility to respond also includes transfer from agent 302 to agent 304 of the responsibility to assert the DEVSEL# signal. In either embodiment, the transfer of the responsibility to respond is transparent to master agent 307. Master agent 307 samples the DEVSEL# and TRDY# signals to determine the status of the target, but master agent 307 neither knows nor cares if the DEVSEL# and TRDY# signals are asserted by the same agent or by different agents. In an embodiment of the present invention wherein bus 301 is not a PCI bus, the responsibility to respond and the transfer of that responsibility would be defined according to the bus protocol.

In another embodiment of the computer system of the present invention, in step 401 of FIG. 4 the transaction on bus 301 is initiated by agent 304 instead of agent 307. In this embodiment it is possible for agent 304 to initiate as the master and respond as the target of the same transaction on bus 301. Therefore, agent 304 can be the master of a transaction without requiring agent 304 to determine where the target resides. Agent 304 initiates the transaction on bus 301, and if the target is on bus 305 the responsibility to respond will be transferred to agent 304 by agent 302.

Thus, the present invention provides for two agents to be coupled to one bus without requiring either agent to implement a positive decode. The present invention also provides for two agents to behave as subtractive decode agents on bus 301, albeit at different times. This aspect of the present invention involves the use of signal 309, referred to herein as the MT (master type) signal, between agents 302 and 304.

Figure 5:
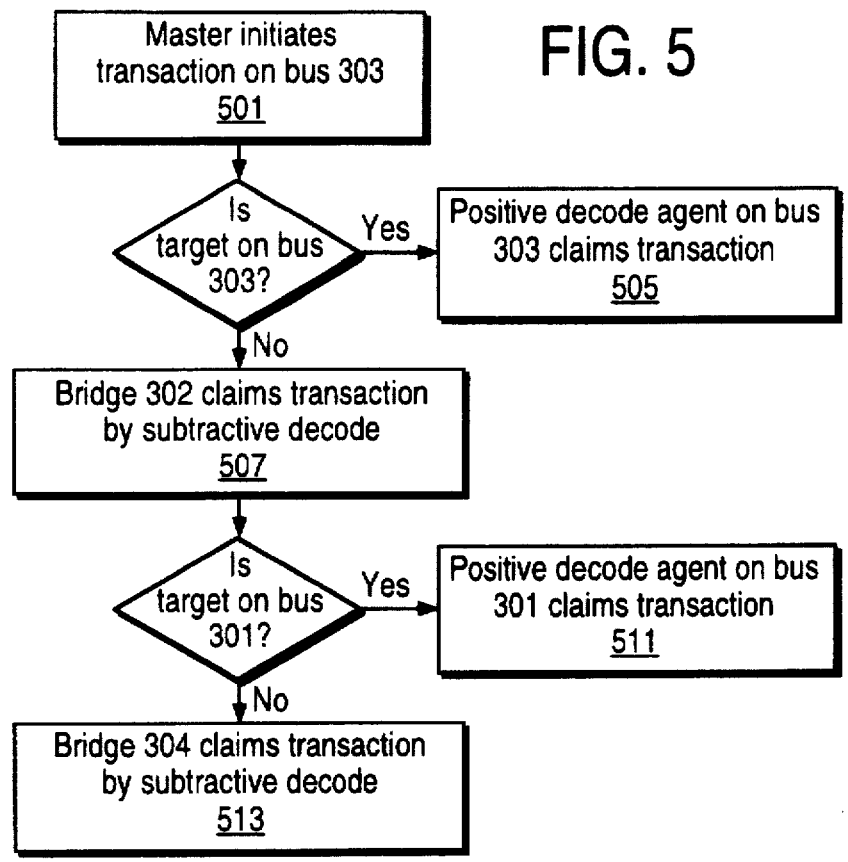
FIG. 5 is a flow diagram illustrating the use of the MT signal in determining the target of a bus transaction according to one embodiment of the present invention.

FIG. 5 illustrates the use of MT signal 309. In step 501 of FIG. 5, master agent 308 initiates a transaction on bus 303 that could be targetted to an agent on bus 301, bus 303, or bus 305. If the transaction is targetted to an agent on bus 303, that agent performs a positive decode and claims the transaction in step 505. However, if the transaction is not claimed by positive decode on bus 303, agent 302 claims the transaction by subtractive decode in step 507, and forwards the transaction to bus 301. In this case, agent 302 remains the subtractive decode agent on bus 303. However, behaving as the subtractive decode agent on bus 303 does not require agent 302 to behave as the subtractive decode agent on bus 301. Furthermore, there is no need for agent 302 to behave as the subtractive decode agent on bus 301, because there is no need for agent 302 to forward the transaction back to bus bus 303. Therefore, agent 304 can behave as the subtractive decode agent on bus 301. Agent 302 uses MT signal 309 to indicate to agent 304 that the transaction originated on bus 303 and that agent 304, instead of agent 302, should behave as the subtractive decode agent on bus 301 by waiting a finite period of time before claiming the transaction without decoding. Then, if the transaction is targetted to an agent on bus 301, that agent performs a positive decode and claims the transaction on bus 301 in step 511. However, if no agent on bus 301 claims the transaction, then by the process of elimination, the target of the transaction must reside on bus 305. Therefore, in step 513, agent 304 claims the transaction without decoding.

Figure 6:
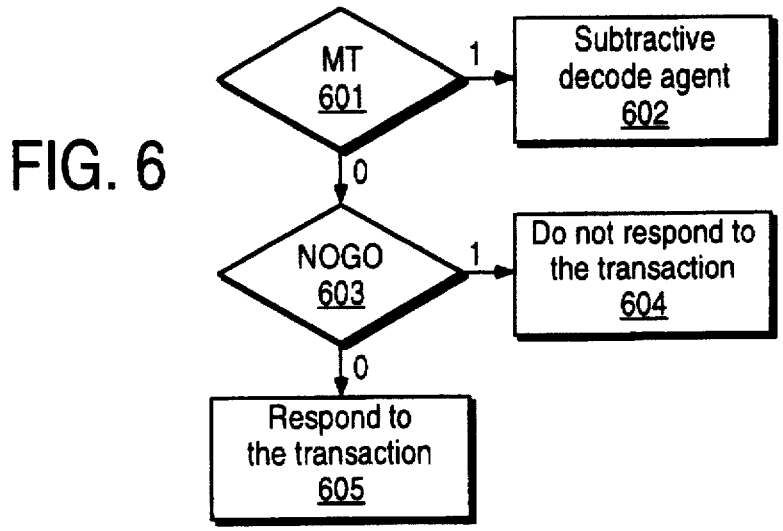
FIG. 6 is a flow diagram illustrating the behavior of one of the subtractive decode agents according to one embodiment of the present invention.

The behavior of agent 304 is illustrated by the flow diagram of FIG. 6. For this illustration, assume that MT signal 309 is a digital signal that agent 302 drives to '1' when the master is on bus 303, and to '0' when the master is on bus 301. Also assume that NOGO signal 306 is a digital signal that agent 302 drives to '1' when agent 302 is retaining the responsibility to respond to the transaction, and to '0' when agent 302 is transferring the responsibility to respond to the transaction to agent 304. FIG. 6 shows that NOGO signal 306 might be ignored depending on the value of MT signal 309. If MT signal 309 is '1', then agent 304 always behaves as a subtractive decode agent (block 602). However, if MT signal 309 is '0', then agent 304 is prevented from claiming the transaction by subtractive decode, and the subsequent behavior of agent 304 depends on NOGO signal 306. If NOGO signal 306 is '1', then agent 304 does not respond to the transaction (block 604). If NOGO signal 306 is '0', then agent 304 responds the transaction (block 605). If desired, other signal types or encodings can be used.

Figure 7:
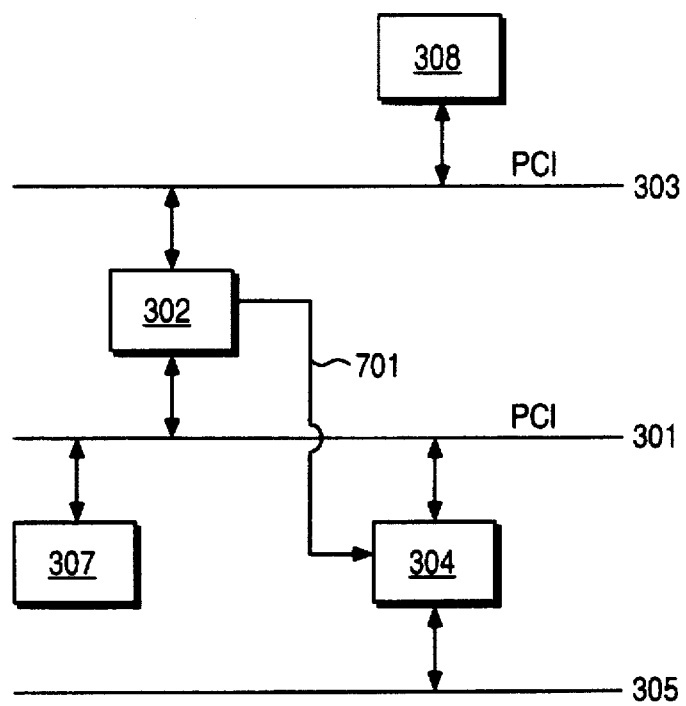
FIG. 7 is a block diagram of the computer system of FIG. 3 wherein the NOGO signal and the MT signal share one signal line.
Figure 8:
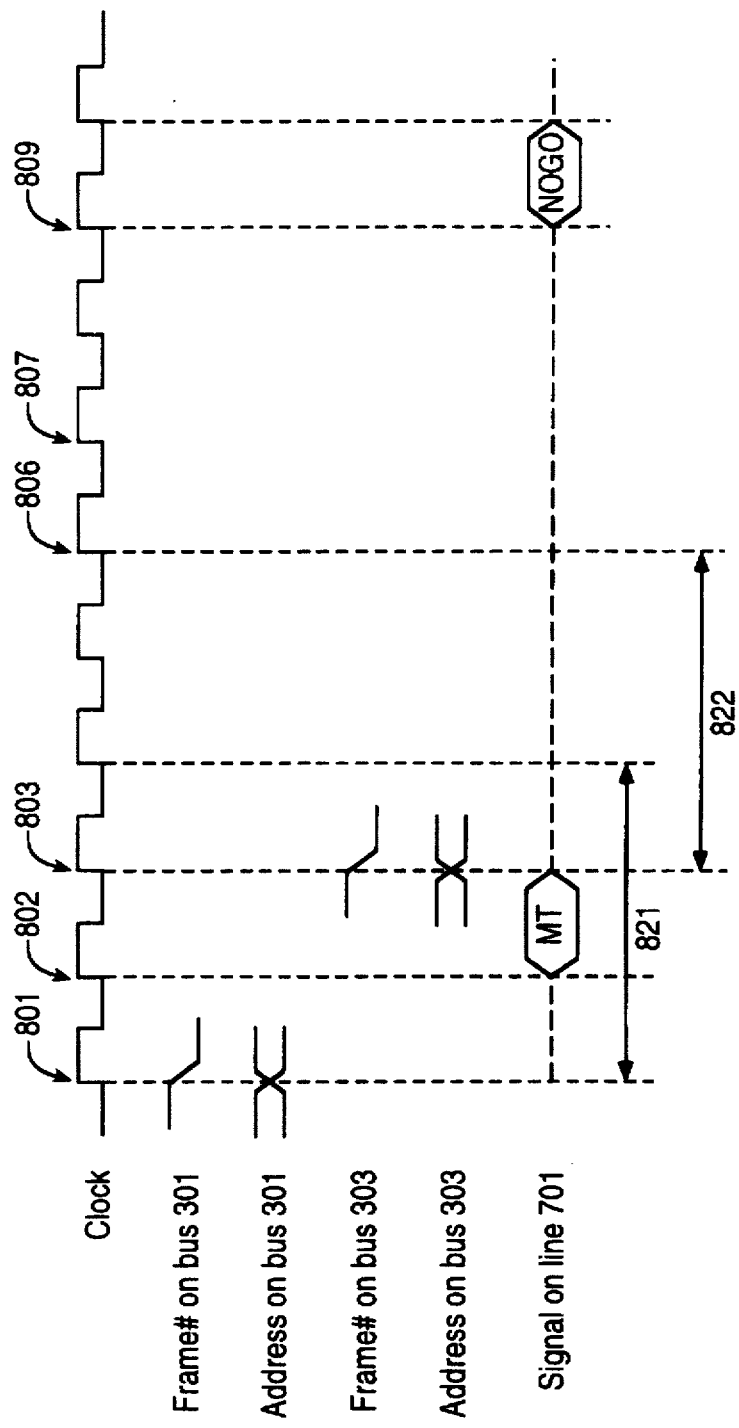
FIG. 8 is a timing diagram illustrating an implemention of the present invention in which the NOGO and MT signals are time-multiplexed over one signal line.

Although it is possible to use separate signal lines for NOGO signal 306 and MT signal 309 within the scope of the present invention, it is preferable to use one signal line for both signals in order to reduce the pincounts of and the routing between agents 302 and 304. FIG. 7 is a block diagram of the computer system of FIG. 3 wherein NOGO signal 306 and MT signal 309 share signal line 701. FIG. 8 is a timing diagram illustrating an implemention of the present invention in which NOGO signal 306 and MT signal 309 are time-multiplexed over signal line 701.

To understand FIG. 8 it is important to understand that, within the scope of the present invention, agent 302 can be implemented in a number of ways. For example, agent 302 can be implemented to pass virtually all signals from one bus to the other with minimum delay. Alternatively, agent 302 can be implemented to select certain transactions on one bus and recreate only those transactions on the other bus. Therefore, the steps, signals, and timings associated with forwarding a transaction from one bus to another would vary according to the implementation of agent 302. Above, to best introduce the use of NOGO signal 306 and MT signal 309, it was assumed that agent 302 forwarded a transaction at the same time that agent 302 claimed the transaction by subtractive decode. However, agent 302 could forward a transaction or pass signals associated with the transaction before or after agent 302 claims the transaction by subtractive decode, or even if agent 302 does not claim the transaction by subtractive decode. For the purposes of FIG. 8, assume that agent 302 passes certain signals, such as the FRAME# signal and the address, before it claims the transaction by subtractive decode. Also, assume that there is a delay of two clock periods from one side of the bridge to the other side of the bridge.

Referring now to FIG. 8 in conjunction with FIG. 7, a transaction is initiated at time 801 by the assertion of the FRAME# signal on bus 301. Also at time 801, the address on bus 301 changes to correspond to the target address of the new transaction. The FRAME# signal and the new address are passed across agent 302, resulting in agent 302 asserting the FRAME# signal and driving the new address on bus 302 at time 803.

At time 802, one clock period after the transaction is initiated, agent 302 drives the appropriate value of the MT signal on signal line 701. Thus, the clock period beginning at time 802 is called the MT window. At the end of the MT window, agent 304 samples the state of the signal line 701 to determine the value of the MT signal.

Signal line 701 is later reused to transfer the NOGO signal. Transfer of the NOGO signal can occur only after it has been determined whether the target resides on either bus 301 or bus 303. Assume that the slowest positive decode agent on either bus requires three clock periods for decoding. Consequently, positive decoding occurs during time period 821 on bus 301 and during time period 822 on bus 303. The last opportunity for a positive decode agent to claim the transaction is during the clock period starting at time 806. Therefore, at time 807, agent 302 determines whether the target is on either bus 301 or bus 303. Then, there is a delay of two clock periods before agent 302 drives the appropriate value of the NOGO signal on signal line 701. Thus, the clock period beginning at time 809 is called the NOGO window. At the end of the NOGO window, agent 304 samples the state of signal line 701 to determine the value of the NOGO signal.

As described above, the MT signal and the NOGO signal are time-multiplexed over signal line 701. The MT window begins one clock period after the transaction is initiated. With a PCI to PCI bridge delay of two clock periods, the NOGO window begins eight clock periods after the transaction is initiated. In general, the NOGO window begins N clock periods after the transaction is initiated, where N is four clock periods plus twice the PCI to PCI bridge delay. Of course, the duration and placement of either window could be varied to accommodate design considerations or a different bus protocol.

Figure 9:
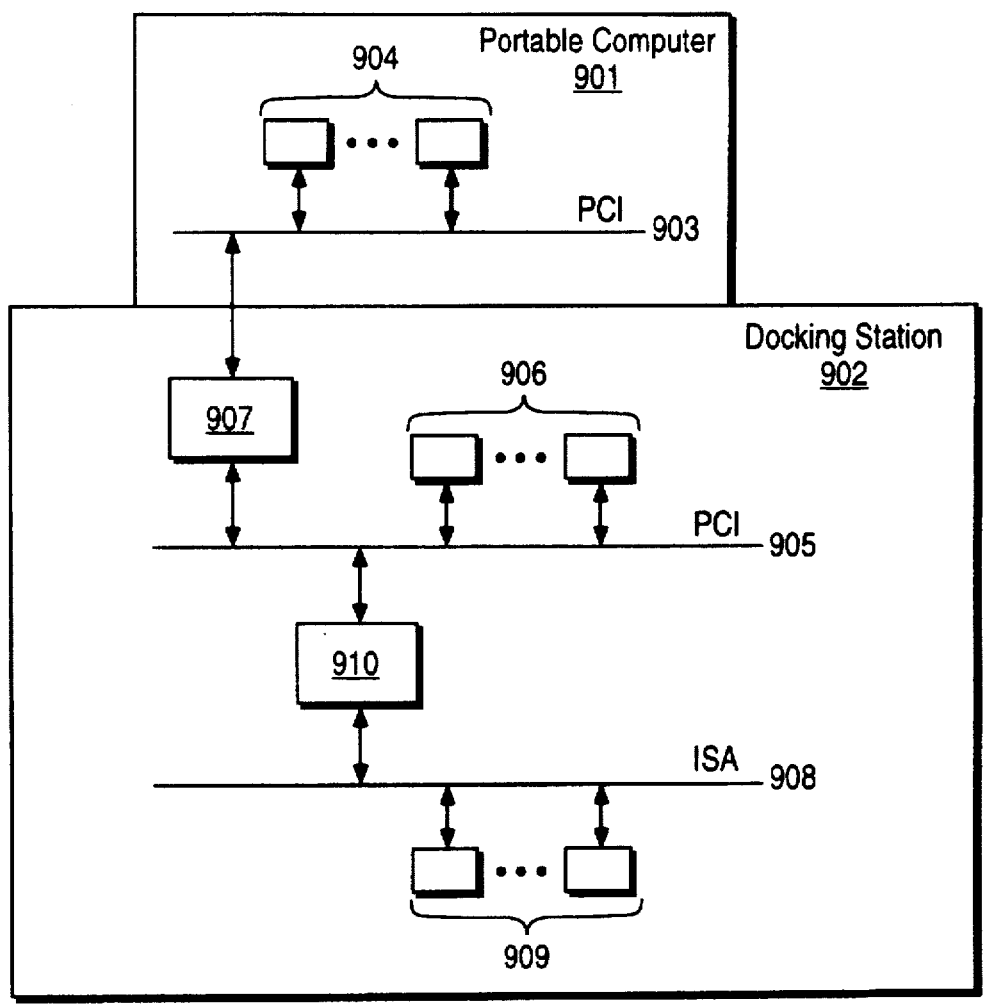
FIG. 9 is a block diagram of one embodiment of the present invention in a portable computer with a docking station.

Thus, the present invention provides for the support of two subtractive decode agents on the same bus. One application of the invention is on a PCI bus in the docking station of a portable computer, as illustrated in FIG. 9. The portable computer 901 has a primary PCI bus 903 populated with a number of agents 904, and the address range of agents 904 encompasses the address space of ISA legacy devices. The portable computer 901 can be docked to a docking station 902 with a secondary PCI bus 905 populated by a number of agents 906 that provide additional resources. The two PCI buses 903 and 905 are connected through PCI to PCI bridge 907. It is desirable to have an Industry Standard Architecture (ISA) bus 908 in docking station 902 to provide support for a number of ISA legacy devices 909. Consequently, there would be two bus bridges on the secondary PCI bus 905, bridge 907 to the primary PCI bus 903 and bridge 910 to ISA bus 908. The address spaces behind these two bridges would be overlapping, fragmented, and possibly dynamic. Therefore, it is advantageous to implement both bridges as subtractive decode agents using the present invention.

What is claimed is:

1. A computer system comprising:
   a first bus;
   a first agent coupled to the first bus that claims to be a target of a transaction on the first bus without decoding an address associated with the transaction;

a second agent coupled to the first bus, the second agent responding to the transaction as the target if the first agent indicates the second agent is to respond.

2. The computer system of claim 1 wherein the first agent signals the second agent to prevent the second agent from claiming to be the target of the transaction.

3. The computer system of claim 1 wherein the first agent signals the second agent to respond to the transaction.

4. The computer system of claim 1 further comprising:

a first signal from the first agent to prevent the second agent from claiming to be the target of the transaction; and a second signal from the first agent to signal the second agent to respond to the transaction.

5. The computer system of claim 4 wherein the first signal and the second signal are time-multiplexed.

6. The computer system of claim 1 wherein the second agent initiates the transaction.

7. The computer system of claim 1 further comprising a third agent that initiates the transaction.

8. The computer system of claim 1 wherein the first agent comprises a bridge to a second bus.

9. The computer system of claim 8 wherein the second agent comprises a bridge to a third bus.

10. The computer system of claim 1 wherein the first bus comprises a PCI bus.

11. The computer system of claim 10 wherein the first agent comprises a bridge to a second PCI bus.

12. The computer system of claim 10 wherein the second agent comprises a bridge to an ISA bus.

13. The computer system of claim 11 wherein the first PCI bus is in a docking station and the second PCI bus is in a portable computer.

14. The computer system of claim 13 wherein the second agent comprises a bridge to an ISA bus in the docking station.

15. A computer system comprising:

a first bus;

at least one agent of a first type of agent that claims to be a target of transactions on the first bus after decoding addresses associated with the transactions;

a first agent of a second type of agent that claims to be a target of all transactions on the first bus that are unclaimed after a finite period of time; and a second agent that responds as the target to transactions claimed by the first agent if the first agent transfers a responsibility to respond to the second agent.

16. The computer system of claim 15 wherein the first agent comprises a bridge to a second bus.

17. The computer system of claim 16 further comprising at least one agent of the first type coupled to the second bus, wherein:

the first agent forwards transactions on the first bus to the second bus; and the first agent transfers the responsibility to respond to the second agent when no agent claims the transaction on the second bus.

18. The computer system of claim 16 further comprising a signal indicating whether a transaction on the first bus is forwarded from the second bus.

19. The computer system of claim 18 wherein the second agent behaves as an agent of the second type when the transaction is forwarded.

20. The computer system of claim 18 wherein the signal indicating whether a transaction is forwarded is time-multiplexed with a signal indicating whether the responsibility to respond is transferred.

21. A method of determining a target of a transaction initiated on a first bus of a computer system, the method comprising:

a first agent on the first bus claiming to be the target of the transaction; and the first agent transferring a responsibility to respond to a second agent on the first bus.

22. The method of claim 21, further comprising a step of the first agent waiting a finite period of time for an agent on the first bus to claim the transaction by decoding an address associated with the transaction prior to the first agent claiming the transaction.

23. The method of claim 21, further comprising the following steps prior to the first agent transferring the responsibility to respond to the second agent:

the first agent forwarding the transaction to a second bus; and the first agent waiting a finite period of time for an agent to claim the transaction on the second bus by decoding the address associated with the transaction.

24. The method of claim 21 further comprising a step of the first agent signalling the second agent to prevent the second agent from claiming the transaction prior to the first agent claiming the transaction.

25. The method of claim 24 wherein a signal to transfer the responsibility to respond is time-multiplexed with a signal to prevent the second agent from claiming the transaction.

* * * * *